United States Patent
Pechtold et al.

(10) Patent No.: US 7,159,456 B2
(45) Date of Patent: Jan. 9, 2007

(54) LEVEL INDICATOR FOR LIQUID HYDROGEN TANK

(75) Inventors: Rainer Pechtold, Russelsheim (DE); Andreas Koenekamp, Darmstadt (DE); Hartmut Stengelin, Mainz (DE); Andy Kraemer, Ruesselsheim (DE)

(73) Assignee: General Motors Corporation, Detroit, MI (US)

( * ) Notice: Subject to any disclaimer, the term of this patent is extended or adjusted under 35 U.S.C. 154(b) by 165 days.

(21) Appl. No.: 11/009,525

(22) Filed: Dec. 10, 2004

(65) Prior Publication Data

US 2006/0123902 A1  Jun. 15, 2006

(51) Int. Cl.
 *G01F 23/26* (2006.01)
(52) U.S. Cl. ............................ 73/200; 73/304 C
(58) Field of Classification Search ............ 73/304 R, 73/304 C, 200, 313; 340/450; 116/227
 See application file for complete search history.

(56) References Cited

U.S. PATENT DOCUMENTS

| | | | | |
|---|---|---|---|---|
| 2,409,073 A | * | 10/1946 | Sias et al. ............ | 340/870.37 |
| 3,147,878 A | * | 9/1964 | Wissmiller ............ | 220/560.1 |
| 3,293,914 A | * | 12/1966 | Renoult ............ | 73/304 C |
| 3,371,533 A | * | 3/1968 | Dumas ............ | 73/295 |
| 5,735,167 A | * | 4/1998 | Puukangas et al. ....... | 73/304 C |
| 6,016,697 A | * | 1/2000 | McCulloch et al. ...... | 73/304 C |
| 6,295,869 B1 | * | 10/2001 | Delatte ............ | 73/304 C |

FOREIGN PATENT DOCUMENTS

JP  2001349767 A  * 12/2001

* cited by examiner

*Primary Examiner*—Hezron Williams
*Assistant Examiner*—Tamiko Bellamy
(74) *Attorney, Agent, or Firm*—Charles H. Ellerbrock

(57) ABSTRACT

A liquid hydrogen tank assembly that employs a level sensor inductively coupled through the tank walls so as to minimize one conductive heat path through the tank walls. The tank assembly includes an inner tank and an outer tank having a vacuum layer therebetween to maintain the liquid hydrogen within the inner tank under cryogenic temperatures. A capacitive level sensor is positioned within the inner tank and provides an electrical indication of the level of the liquid hydrogen within the inner tank. The level sensor is electrically coupled to an inner coil within the inner tank. An outer coil is provided proximate the outer tank wall and is electrically coupled to a signal processing and conditioning circuit.

17 Claims, 2 Drawing Sheets

LEVEL INDICATOR FOR LIQUID HYDROGEN TANK

BACKGROUND OF THE INVENTION

1. Field of the Invention

This invention relates generally to a device for indicating the amount of hydrogen in a liquid hydrogen tank and, more particularly, to a device for indicating the amount of hydrogen in a liquid hydrogen storage tank, where the device employs inductively coupled coils inside and outside of the tank so as to limit the heat flow through the tank walls.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

In an automotive fuel cell application, the hydrogen is sometimes stored in a cryogenic tank on the vehicle, where the hydrogen is a liquid at very cold temperatures, such as 25° K. The cryogenic tank typically includes an inner tank and an outer tank with a vacuum and a multilayer insulation (MLI) layer therebetween to limit heat penetration into the inner tank to maintain the liquid hydrogen in its super cold state.

FIG. 1 is a cross-sectional plan view of a known liquid hydrogen tank assembly 10 of this type. The tank assembly 10 includes an inner tank 12, an outer tank 14 and a vacuum and MLI layer 16 therebetween. Liquid hydrogen 18 is stored Within the inner tank 12 in a cryogenic state. The liquid hydrogen 18 is removed from the inner tank 12 through a suitable mechanical cryo-valve (not shown). As the liquid hydrogen 18 is removed from the tank 12, the remaining volume within the inner tank 12 includes gaseous hydrogen 20.

It is desirable to know the level of the liquid hydrogen 18 within the inner tank 12 so that the tank assembly 10 can be refilled at the appropriate time. Therefore, the tank assembly 10 includes a level sensor 22 positioned within the inner tank 12 for this purpose. The level sensor 22 provides an electrical signal indicative of the level of the liquid hydrogen 18 within the tank 12 on output lines 24 that is received by a signal conditioning circuit 26 outside of the outer tank 14. An output signal from the signal conditioning circuit 26 provides the level of the liquid hydrogen 18 in the tank assembly 10.

FIG. 2 is a schematic diagram of the level sensor 22 separated from the tank assembly 10. The level sensor 22 includes an outer conductive tube 30 and an inner conductive tube 32 coaxially aligned so as to define a gap 34 therebetween. The conductive tubes 30 and 32 can be made of any conductive material suitable for a cryogenic environment, such as stainless steel. Space holders 36 maintain the gap 34 to allow the liquid hydrogen 18 to flow between the tubes 30 and 32.

The level sensor 22 operates on the principal that an electrical capacitance exists between the inner tube 32 and the outer tube 30, and this capacitance will be different when the gaseous hydrogen 20 is the dielectric and when the liquid hydrogen 18 is the dielectric. As the level of the liquid hydrogen 18 within the tank 12 changes, the capacitance between the inner tube 32 and the outer 30 also changes. Particularly, the liquid hydrogen 18 will be more conductive than the gaseous hydrogen 20 so that the capacitance of the level sensor 22 will decrease as the level of the liquid hydrogen 18 within the inner tank 12 decreases. The signal conditioning circuit 26 applies an AC signal to the tubes 30 and 32, and the capacitance of the level sensor 22 changes in response to the AC signal depending on the level of the liquid hydrogen 18 within the tank 12. The capacitive output from the lines 24 is calibrated to provide an indication of the amount of the liquid hydrogen 18 within the tank assembly 10.

When the fuel cell system is shut off, the liquid hydrogen 18 has a very low temperature. As time passes the temperature of the hydrogen 18 within the tank 12 slowly increases because of heat conductive paths from the tank 12 to the outside environment. As the temperature of the hydrogen 18 increases, the pressure within the tank 12 also increases. However, the pressure within the tank 12 is limited to a critical value, referred to as the boil-off pressure. If the pressure within the tank 12 reaches the boil-off pressure, hydrogen must be released from the tank assembly 10 to prevent a further increase of the pressure, which is undesirable. The time from when the fuel cell system is shut off to when the boil-off pressure is reached in the tank 12 is the autonomy time. Because vehicles are sometimes not operated for extended periods of time, it is desirable to maximize the autonomy time by minimizing the heat loss from the tank assembly 10.

Because the wires 24 extend through the walls of the inner tank 12, the vacuum and MLI layer 16 and the outer tank 14 to the outside environment, they provide a conductive heat path from the external environment to the liquid hydrogen 18 within the tank 12. This heat conductive heat path increases the rate that the liquid hydrogen 18 is heated, and thus increases the pressure within the inner tank 12, reducing the autonomy time. Also, passing the wires 24 through the tanks 12 and 14 provides difficult design requirements for sealing the tanks 12 and 14. It would be desirable to reduce or eliminate this conductive heat path to increase the autonomy time of the tank assembly 10.

SUMMARY OF THE INVENTION

In accordance with the teachings of the present invention, a liquid hydrogen tank assembly is disclosed that employs a level sensor inductively coupled through the tank walls so as to eliminate or minimize one conductive heat path through the tank walls. The tank assembly includes an inner tank and an outer tank having a vacuum and insulation layer therebetween to maintain the liquid hydrogen within the inner tank under cryogenic temperatures. A level sensor, such as a capacitive level sensor, is positioned within the inner tank and provides an electrical indication of the level of the liquid hydrogen within the inner tank. The level sensor is electrically coupled to an inner coil within the inner tank. An outer coil is provided proximate the outer tank wall and is electrically coupled to a signal processing and conditioning circuit.

The capacitive level sensor and the inner coil define an LC oscillator whose resonant frequency changes as the level of the liquid hydrogen changes. An AC signal is applied to the outer coil whose frequency is varied. When the frequency of the AC signal matches the resonant frequency of the LC oscillator, a current in the outer coil is a maximum, thus providing an indication of the level of the liquid hydrogen.

In one embodiment, a suitable non-conductive material, such as a glass window, is provided in the insulation layer to allow the inner and outer coils to be inductively coupled. In an alternate embodiment, the outer coil is positioned within the insulation layer.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a liquid hydrogen storage tank including a level sensor inductively couple to an external control circuit is merely exemplary in nature, and is in no way intended to limit the invention or its applications or uses. For example, the liquid hydrogen storage tank discussed herein has particular application for storing liquid hydrogen on a fuel cell vehicle. However, as will be appreciated by those skilled in the art, the liquid hydrogen storage tank has other applications.

Figure 1:
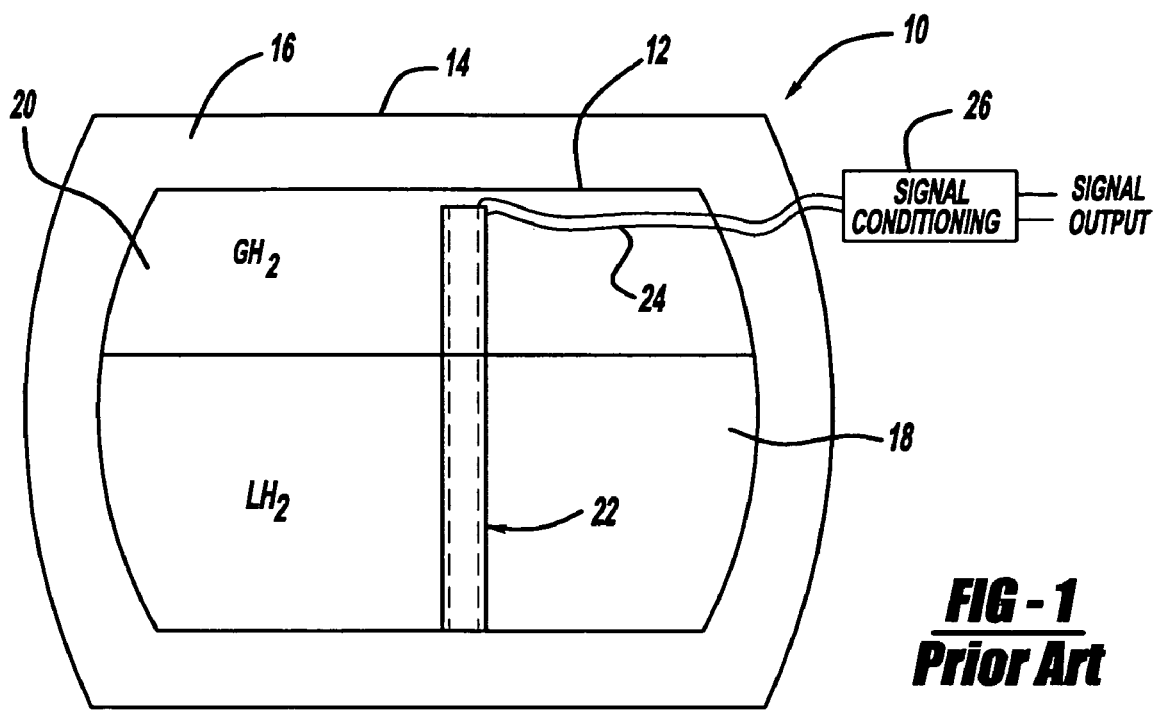
FIG. 1 is a cross-sectional plan view of a liquid hydrogen storage tank assembly employing a level sensor of the type known in the art.
Figure 2:
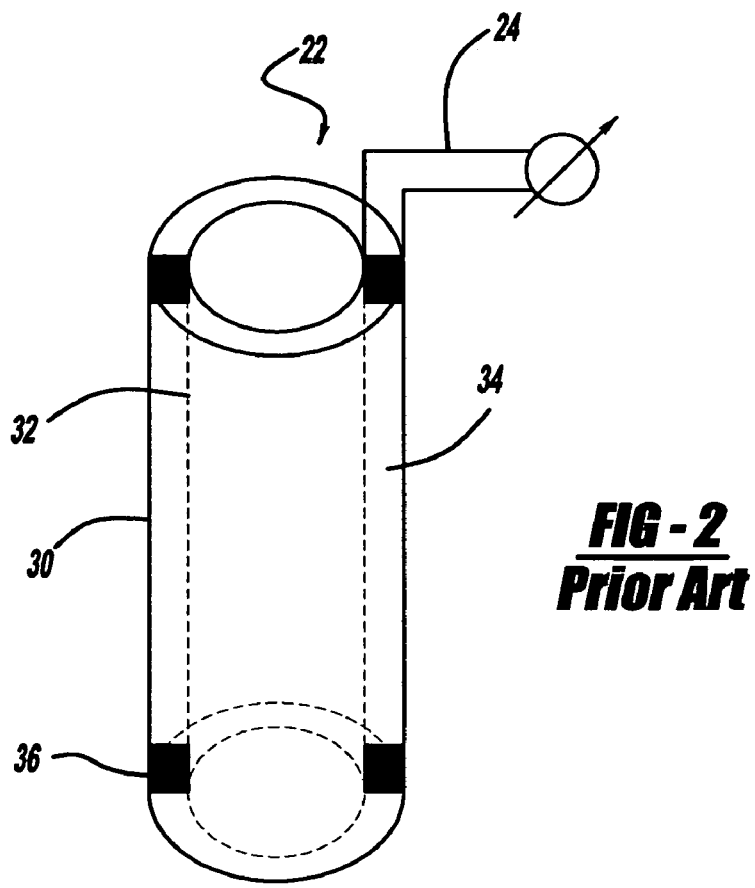
FIG. 2 is a schematic plan view of the level sensor shown in FIG. 1 removed from the liquid hydrogen tank assembly.
Figure 3:
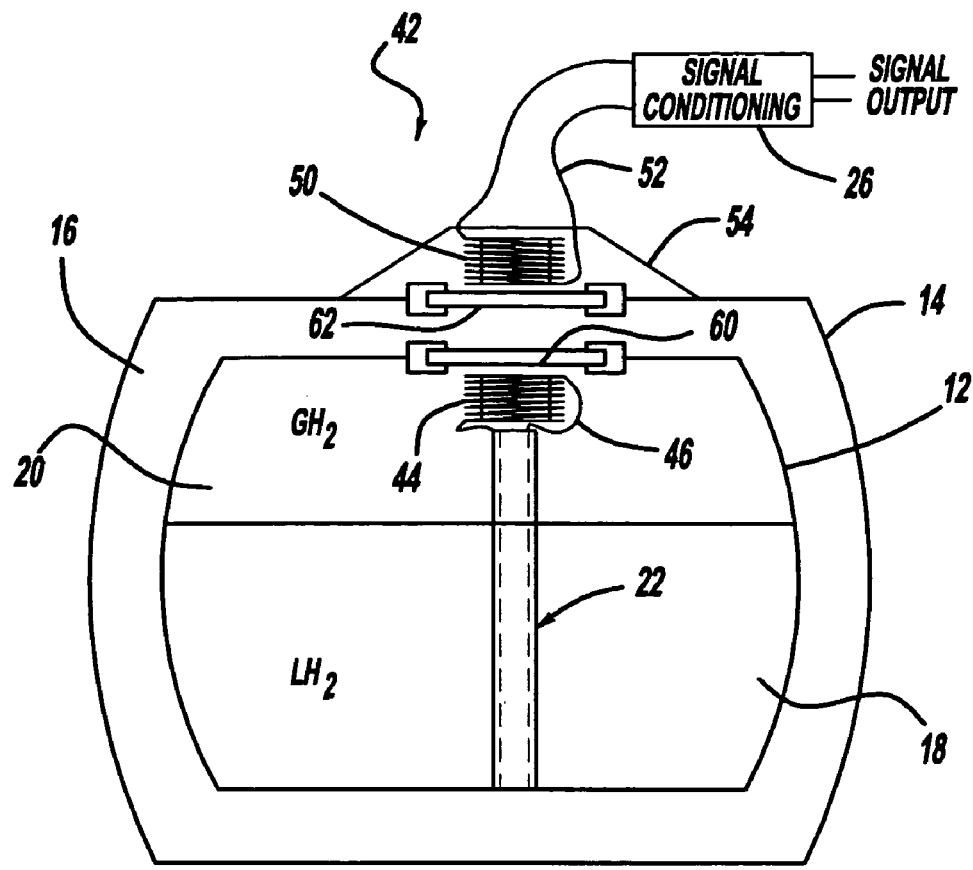
FIG. 3 is a cross-sectional view of a liquid hydrogen storage tank assembly employing a level sensor that is inductively coupled to an exterior control circuit, according to one embodiment of the present invention.

FIG. 3 is a cross-sectional plan view of a liquid hydrogen storage tank assembly 42, according to one embodiment of the present invention, that is similar to the tank assembly 10 discussed above, where like elements are identified by the same reference numeral. The tank assembly 42 includes the capacitive level sensor 22 discussed above as a representative example. However, any suitable capacitive sensor able to withstand the cryogenic temperatures and provide an electrical signal of the level of the liquid hydrogen 18 within the inner tank 12 can be employed. As will be discussed in detail below, the tank assembly 42 eliminates the wires 24 extending through the tanks 12 and 14 and the MLI layer 16, thus eliminating that conductive heat path from the environment to the inner tank 12.

The tank assembly 42 includes an inner coil 44 electrically coupled to the inner and outer tubes 32 and 30 by a wire 46, where the inner coil 44 is completely contained within the inner tank 12. The tank assembly 42 further includes an outer coil 50 positioned outside of the outer tank 14, but in close proximity to the tank 14. The outer coil 50 is electrically coupled to the signal conditioning circuit 26 by electrical wire lines 52. As will be discussed in further detail below, the inner coil 44 and the outer coil 50 are inductively coupled to provide an indication of the level of the liquid hydrogen 18 within the tank 12. A cover 54 mounted to the outer tank 14 protects the outer coil 50.

In one embodiment, the inner tank 12 and the outer tank 14 are made of a metal, such as stainless steel, which will prevent inductive coupling. Therefore, the tank assembly 42 includes a non-conductive window 60 between the inner coil 44 and the MLI layer 16, and a non-conductive window 62 between the outer coil 50 and the MLI layer 16, as shown. In one embodiment, the windows 60 and 62 are glass windows, but other non-conductive materials can be employed that are suitable for a cryogenic environment.

As discussed above, the tubes 30 and 32 provide a capacitance representative of the level of the liquid hydrogen 18 within the tank 12. The capacitance of the level sensor 22 and the inductance of the inner coil 44 provide an LC oscillator. The resonant frequency of the LC oscillator changes depending on the capacitance of the level sensor 22 as the level of the liquid hydrogen 18 changes. The circuit 26 provides an AC frequency signal to the outer coil 50 on the lines 52. When the frequency of the AC signal matches the resonant frequency of the LC oscillator provided by the inner coil 44 and the level sensor 22, energy is transferred through the windows 60 and 62 and the MLI layer 16 by inductive coupling. This inductive coupling provides a maximum amplitude current in the outer coil 50 that can be detected by the signal conditioning circuit 26. Therefore, by knowing the frequency applied to the coil 50 that provides the peak amplitude of the current in the coil 50, the resonant frequency of the LC oscillator provided by the inner coil 44 and the level sensor 22 is known. By calibrating the resonant frequency to a particular level of the liquid hydrogen 18 in the tank 12, that level is thus known.

The resonant frequency of the LC oscillator provided by the inner coil 44 and the level sensor 22 can be obtained in any suitable manner. In one embodiment, the AC frequency signal provided to the outer coil 50 is swept over the possible resonant frequencies of the LC oscillator provided by the inner coil 44 and the level sensor 22. When the swept frequency provides a maximum amplitude current signal, the level of liquid hydrogen 18 is thus determined. In an alternate embodiment, the signal conditioning circuit 26 attempts to maintain the maximum current by slightly varying the AC signal applied to the coil 50 as the amplitude of the current signal drops. Other suitable techniques may also be employed.

Figure 4:
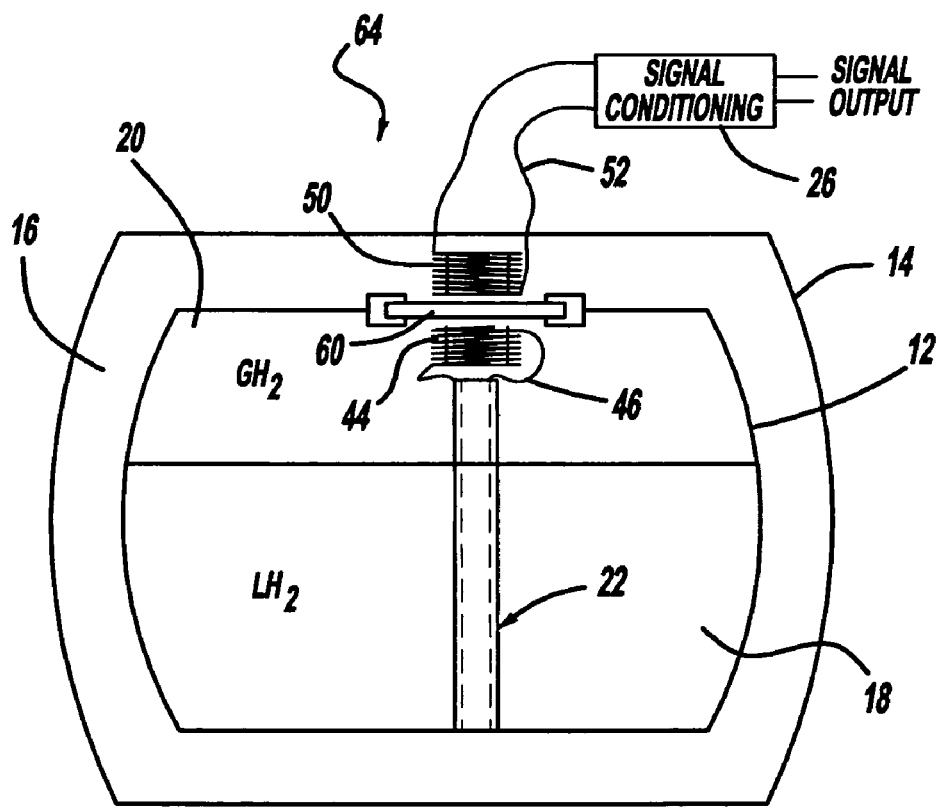
FIG. 4 is a cross-sectional view of a liquid hydrogen storage tank assembly employing a level sensor that is inductively coupled to an exterior control circuit, according to another embodiment of the present invention.

FIG. 4 is a cross-sectional plan view of a liquid hydrogen storage tank assembly 64, according to another embodiment of the present invention, where like elements are identified by the same reference numeral. In this embodiment, the outer coil 50 is positioned within the vacuum and MLI layer 16 at an opposite side of the window 60 from the inner coil 14, as shown. This allows the outer coil 50 to be more closely inductively coupled to the inner coil 44.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A cryogenic tank assembly for storing a liquid, said tank assembly comprising:
    a level indicator positioned within the tank assembly, said level indicator detecting the level of the liquid within the tank assembly;
    an inner coil positioned within the tank assembly and being electrically coupled to the level indicator;
    an outer coil positioned outside of the tank assembly and being responsive to an AC signal, where the inner coil and the outer coil are inductively coupled so that the level of the liquid within the tank assembly can be measured outside of the tank assembly; and at least one non-conductive window positioned between the inner coil and the outer coil.

2. The tank assembly according to claim 1 further comprising an inner tank storing the liquid, an outer tank and a thermal insulation layer between the inner tank and the outer tank.

3. The tank assembly according to claim 2 wherein the inner coil is positioned within the inner tank and the outer coil is positioned outside of the outer tank.

4. The tank assembly according to claim 2 wherein the inner coil is positioned within the inner tank and the outer coil is positioned within the thermal insulation layer between the inner tank and the outer tank.

5. The tank assembly according to claim 1 wherein the level indicator is a capacitive level indicator, and wherein the combination of the capacitive level indicator and the inner coil define an LC oscillator, wherein the AC signal applied to the outer coil is matched to the resonant frequency of the LC oscillator to provide the inductive coupling.

6. The tank assembly according to claim 5 wherein the AC signal is swept to determine when the frequency of the AC signal matches the resonant frequency of the LC oscillator.

7. The tank assembly according to claim 5 wherein the frequency of the AC signal is changed to follow the resonant frequency of the LC oscillator.

8. The tank assembly according to claim 1 wherein the at least one non-conductive window is a glass window.

9. The tank assembly according to claim 1 wherein the at least one non-conductive window is a first window positioned adjacent to the inner coil and a second window positioned adjacent to the outer coil, wherein a vacuum layer is provided between the first window and the second window.

10. The tank assembly according to claim 1 wherein the tank assembly stores liquid hydrogen.

11. The tank assembly according to claim 10 wherein the tank assembly stores liquid hydrogen on a fuel cell vehicle.

12. A cryogenic tank assembly for storing a liquid, said tank assembly comprising:
an inner tank holding the liquid;
an outer tank provided outside of the inner tank;
a vacuum insulation layer provided between the inner tank and the outer tank;
a capacitive level indicator positioned within the inner tank, said level indicator detecting the level of the liquid within the inner tank;
an inner coil positioned within the inner tank and being electrically coupled to the level indicator, wherein the capacitive level indicator and the inner coil define an LC oscillator;
an outer coil positioned outside of the outer tank;
a signal conditioning circuit electrically coupled to the outer coil wherein the signal conditioning circuit provides an AC signal to the outer coil so as to match the frequency of the AC signal with the resonant frequency of the LC circuit to provide an indication of the level of the liquid within the inner tank; and
a first window positioned adjacent to the inner coil in an inner tank wall and a second window positioned adjacent to the outer coil in an outer tank wall.

13. The tank assembly according to claim 12 wherein the tank assembly stores liquid hydrogen.

14. The tank assembly according to claim 13 wherein the tank assembly stores liquid hydrogen on a fuel cell vehicle.

15. A cryogenic tank assembly for storing liquid hydrogen, said tank assembly comprising:
an inner tank holding the liquid hydrogen;
an outer tank provided outside of the inner tank;
a vacuum insulation layer provided between the inner tank and the outer tank;
a capacitive level indicator positioned within the inner tank, said level indicator detecting the level of the liquid within the inner tank;
an inner coil positioned within the inner tank and being electrically coupled to the level indicator, wherein the capacitive level indicator and the inner coil define an LC oscillator;
an outer coil positioned in the vacuum insulation layer; and
a signal conditioning circuit electrically coupled to the outer coil, wherein the signal conditioning circuit provides an AC signal to the outer coil so as to match the frequency of the AC signal with the resonant frequency of the LC circuit to provide an indication of the level of the liquid hydrogen within the inner tank.

16. The tank assembly according to claim 15 wherein the frequency of the AC signal is changed to follow the resonant frequency of the LC oscillator.

17. The tank assembly according to claim 15 wherein the AC signal is swept to determine when the frequency of the AC signal matches the resonant frequency of the LC oscillator.

* * * * *